(12) United States Patent
Klein

(10) Patent No.: US 6,311,245 B1
(45) Date of Patent: Oct. 30, 2001

(54) METHOD FOR TIME MULTIPLEXING A LOW-SPEED AND A HIGH-SPEED BUS OVER SHARED SIGNAL LINES OF A PHYSICAL BUS

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/092,585

(22) Filed: Jun. 5, 1998

(51) Int. Cl.[7] ........................................ G06F 13/00
(52) U.S. Cl. ............................. 710/126; 710/107
(58) Field of Search .......................... 710/100–132; 713/501, 400

(56) References Cited

U.S. PATENT DOCUMENTS

| | | |
|---|---|---|
| 4,851,990 * | 7/1989 | Johnson et al. . |
| 5,392,422 * | 2/1995 | Hoel et al. . |
| 5,809,291 * | 9/1998 | Munoz-Bustamante et al. . |
| 6,012,116 * | 1/2000 | Aybay et al. .................... 710/113 |
| 6,173,349 * | 1/2001 | Qureshi et al. .................. 710/110 |

* cited by examiner

Primary Examiner—Paul R. Myers
(74) Attorney, Agent, or Firm—Dorsey & Whitney LLP (57) ABSTRACT

A method for combining a low-speed communications bus and a high-speed communications bus into a single multiplexed communications bus that supports both low-speed and high-speed operations. The multiplexed communications bus contains a low-speed state machine and a high-speed state machine. The multiplexed communications bus is controlled by the low-speed state machine and operated at low speed in order to conduct transactions between two low-speed peripheral devices, and is controlled by the high-speed state machine and operated at high speed in order to conduct transactions between and two high-speed peripheral devices. For transactions between peripheral devices having different speeds, either a buffer is used to store data between data transmission and data reception by the two devices, or the low-speed and high-speed state machines are synchronized and operationally interleaved.

38 Claims, 3 Drawing Sheets

METHOD FOR TIME MULTIPLEXING A LOW-SPEED AND A HIGH-SPEED BUS OVER SHARED SIGNAL LINES OF A PHYSICAL BUS

TECHNICAL FIELD

The present invention relates to bus communication pathways and, in particular, to a method for time multiplexing a physical bus to support both a low-speed bus and a high-speed bus.

BACKGROUND OF THE INVENTION

A bus is a communication pathway that connects two or more devices within a computer system. A bus is a shared transmission medium to which multiple devices can be connected. A signal transmitted by one device may be received by any other device attached to the bus, or even by multiple devices attached to the bus. A bus may contain from 8 to greater than 100 separate signal lines. At any given instant of time, each signal line is assigned to a particular meaning or function. The signal lines can be broadly classified into the following three groups: data lines, address lines, and control lines, although some signal lines time multiplex various combinations of these groups.

The data lines are used to move data from one device to another over the bus. Each data line corresponds to one bit of data. Generally, a bus contains some multiple of 8 data lines with each data line representing one bit of an 8-bit byte. The number of data lines contained in a bus is referred to as the width of the bus. Modem buses may contain 32, 64, 128, or a greater number of data lines. In addition, one or more error detecting or error correcting bits may be transferred on respective signal lines of a bus.

Address lines are used to identify the source or destination of a subsequent data transfer operation. Each device connected to a bus generally has a unique address that can be transmitted through the address lines to notify the device that it is the intended recipient of a following data transfer. As with the data lines, a bus generally contains some multiple of 8 address lines, although an error detecting bit, such as a parity bit, may be included. Common computer architectures use 16, 32, or 64-bit addresses.

Control lines are used by devices to specify operations like, for example, reading data and writing data, as well as for synchronizing access to the bus and for receiving notification of the reception and transmission of data. Certain control lines are shared by multiple devices, while other control lines are dedicated to specific devices.

One special control line is the clock signal line. Bus operations occur over one or more bus cycles. Each bus cycle is composed of one or more clock cycles. In normal operation, the clock signal line rapidly and regularly oscillates between a high state and a low state. One complete oscillation of the clock signal line represents one clock cycle. In a low-speed bus, the clock signal line oscillates with a relatively low frequency, like, for example, 33 megahertz. In a high-speed bus, the clock signal line oscillates with a relatively high frequency of 66 megahertz or 133 megahertz. However, the frequency of the clock signal may be reduced to reduce power consumption, particularly in battery powered portable computers.

A high-speed bus can complete a greater number of bus cycles in a given amount of time, and can thus execute a greater number of bus operations in a given amount of time, than a low-speed bus. A greater number of bus operations per unit of time corresponds to a greater data transfer rate, or bandwidth.

Figure 1:
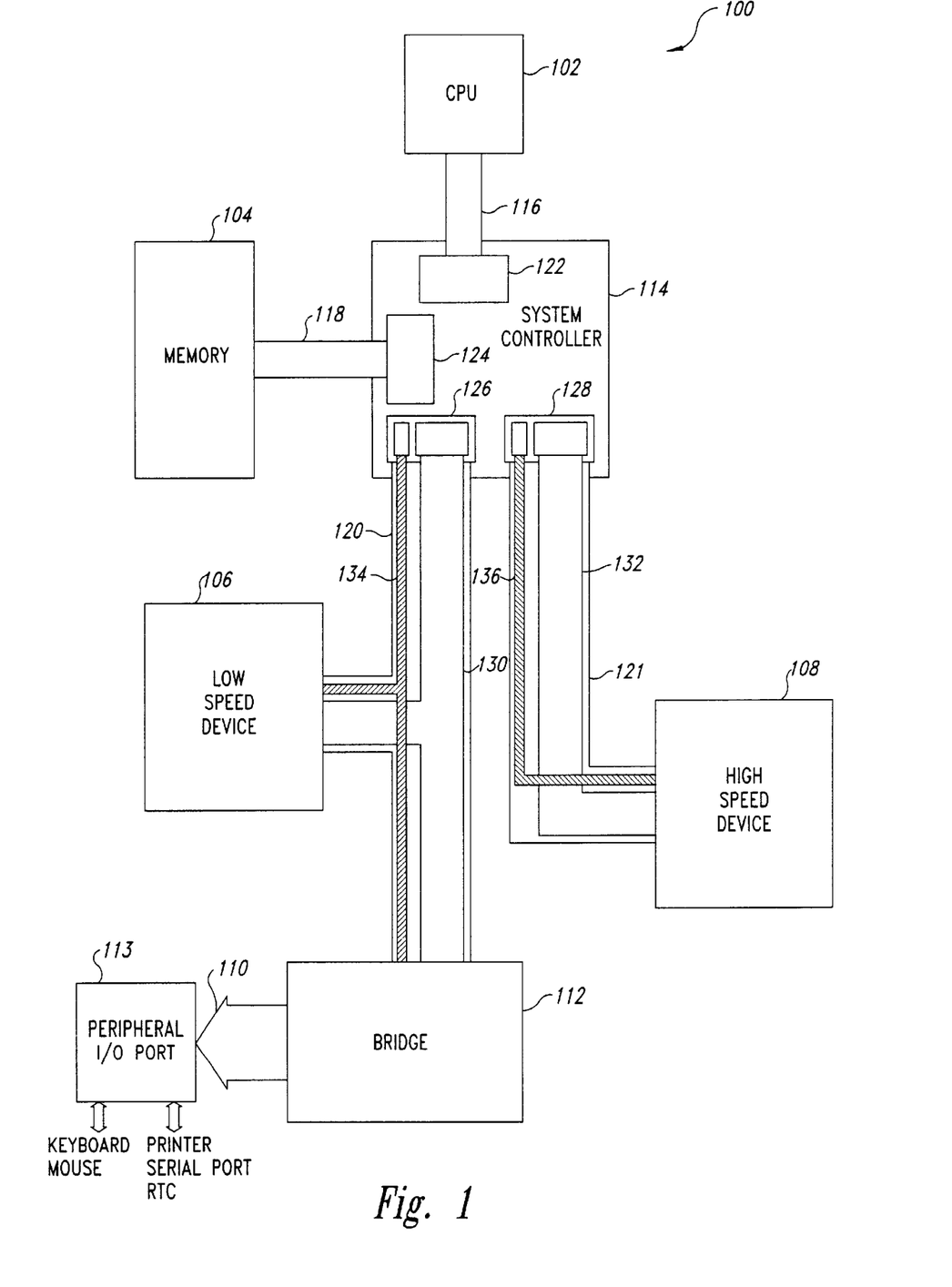
FIG. 1 is a block diagram of a commonly-employed bus architecture within currently-available PCs.

Modem computer systems, such as personal computers ("PCs"), employ a number of different buses that are often hierarchically organized. Using multiple buses, a computer architect is able to isolate certain high volume or time critical data exchanges between particular devices from lower volume or less critical data exchanges, respectively. FIG. 1 is a block diagram of a commonly-employed bus architecture within a currently-available PC 100. The various buses within the PC provide communication pathways between a central processing unit ("CPU") 102, one or more main memories 104, several low-speed devices 106, such as storage or networking devices, a high-speed device 108, such as a gigabit local area network controller or a high-speed graphics device controller, and low-speed devices (not shown), such as a keyboard, mouse, printer or serial port, through a peripheral I/O port 113, such as an Ultra Port manufactured by National Semiconductor, connected to another low-speed bus 110 through a bus bridge 112. A system controller 114 serves within the PC 100 as a sort of terminal and transfer station for a number of important buses. The CPU 102 is connected to the system controller 114 via a CPU bus 116. Main memory 104 is connected to the system controller 114 via a memory bus 118. One or more low-speed devices 106 and the bus bridge 112 are generally connected to the system controller 114 via a 33 megahertz peripheral component interconnect ("PCI") bus 120. High speed devices 108 are commonly connected to the system controller via a 66 megahertz PCI bus or a 133 megahertz advanced graphics processor ("AGP") bus 121. The AGP bus is both a functional and physical superset of the PCI bus.

Buses are connected to the system controller 114 through a collection of pin connectors and logic circuits that together compose a bus interface. The system controller 114 shown in FIG. 1 contains, for example, a CPU bus interface 122, a memory bus interface 124, a low-speed PCI bus interface 126, and a high-speed PCI bus or AGP bus interface 128. The connection interfaces of the system controller 114 and of other integrated circuit devices (not shown) comprise a large number of terminals, including the terminals of the bus interfaces. These terminals are most commonly pin connectors positioned along the sides of packaging for the integrated circuit, but they may also have other forms, such as terminal pads adapted to be mounted on a printed circuit board using a ball grid array. The density of terminals, such as connector pins positioned along the edges of such devices, is a critical limiting factor in the design of modem computer systems. A device that supports an increased functional interface generally requires an increased number of terminals. Increasing the number of terminals, however, adds to the expense and detracts from the reliability of a device, and there are practical limits to the number of terminals that can be incorporated into a given device. While a larger number of terminals can be accommodated by making the package for the integrated circuit larger, doing so requires signals coupled to and from the integrated circuit over a longer signal path. Increasing the length of the signal paths may create internal timing problems and it limits the operating speed of the integrated circuit.

As the width of buses has increased from 16 to 32, and now, commonly, to 64, the number of terminals that comprise a bus interface has also correspondingly increased. In order to minimize the number of terminals required for a bus interface, bus architects have developed a strategy known as time multiplexing. Using this strategy, bus architects are able to use the same physical signal lines both for data transfer and for addressing. In other words, the data lines and the address lines are physically coexistent. Certain of the control lines on the bus can be asserted within a bus cycle to select either an addressing mode or a data transfer mode for bus operation. At any particular instant of time, the data/address signal lines are used either for data transfer or for addressing. At the cost of the addition of several control lines for controlling the selection of either a data transfer mode or an addressing mode, 16, 32, or 64 signal lines that would otherwise be dedicated solely for addressing or for data transfer can be eliminated. Time multiplexing thus provides a way to decrease the number of physical signal lines required to implement a bus and to correspondingly decrease the number of terminals required for the bus interface.

In FIG. 1, the low-speed bus 120 and the high-speed bus 121 are shown to be comprised of both broad sets of signal lines 130 and 132 and narrow sets of signal lines 134 and 136. The broad sets of signal lines 130 and 132 include the shared data/address lines and a majority of the control lines. The narrow sets of signal lines 134 and 136 include a small number of control lines related to control of the bus cycles.

Although use of time multiplexing has enabled computer architects to control the number of terminals required for a particular bus interface, increasing demands for bandwidth and connectivity within computer systems has resulted in the use of an increasing number of different buses. Modern high-speed graphics devices, for example, require rapid transmission of a very high volume of data and therefore require high-speed buses such as the 66 megahertz PCI bus or the 133 megahertz AGP bus. Thus, as shown in FIG. 1, a low-speed bus 120 and a high-speed bus 121 are both needed to provide the bandwidth requirements for the increasing number of low-speed peripheral devices and the high-speed graphics devices commonly required in a modern PC. Many of the low-speed devices cannot be connected to a high-speed bus such as a 66 megahertz PCI bus or a 133 megahertz AGP bus, because the high-speed bus cannot tolerate large capacitive loads. Each additional bus interface requires additional pin connectors that increase the expense and decrease the reliability of the devices that contain them. The Intel 440LX bus bridge, for example, currently requires 492 pin connectors to support 4 buses, including a 32-bit PCI bus and a 32-bit AGP bus. An increase of the width of the PCI and AGP buses to 64 bits will correspondingly increase the number of pin connectors required in the Intel 440LX bus bridge and similar devices. A need has therefore been recognized for a method for incorporating both low-speed and high-speed bus interfaces within a device such as the Intel 440LX bus bridge while, at the same time, minimizing the number of pin connectors that need to be added to the device.

SUMMARY OF THE INVENTION

One embodiment of the present invention in a computer provides a method for multiplexing a low-speed bus and a high-speed bus over shared time-multiplexed control, data and address signal lines. In this embodiment, both low-speed peripheral devices and high-speed peripheral devices are connected to a single set of data and address signal lines. The low-speed peripheral devices are separately connected, in addition, to a small set of dedicated low-speed control lines. Similarly, the high-speed peripheral devices are separately connected to a small set of dedicated high-speed control lines. Bus cycles are controlled during high-speed operation of the bus by the high-speed control lines, and are controlled during low-speed operation of the bus by the low-speed control lines. When a bus operation is initiated by or directed to a low-speed peripheral device, the bus is operated at low speed. When a bus operation is initiated by or directed to a high-speed peripheral devices, the bus is operated at high speed. Bus operations involving both a low-speed and a high-speed peripheral device are initially at the speed of the peripheral device transmitting data to a storage buffer (not shown) in the system controller 114. The system controller 114 then transmits the data from the storage buffer to the peripheral device receiving the data at the speed of the receiving peripheral device. Thus, in this embodiment of the present invention, two different levels of time multiplexing are employed. At one level of time multiplexing, both data and addresses are transmitted over a common set of signal lines. At a second level of time multiplexing, both low-speed and high-speed bus operations are conducted over the shared data and address signal lines. This embodiment of the present invention essentially combines two different physical buses into a single physical bus and two corresponding bus interfaces into a single bus interface that requires far less terminals than the sum of the terminals required for the two separate bus interfaces.

DETAILED DESCRIPTION OF THE INVENTION

The present invention provides a method for time multiplexing a low-speed bus and a high-speed bus over the data/address lines and a majority of the control lines of a single physical bus. The present invention can be alternatively viewed as a method for combining a low-speed bus and a high-speed bus together into a single bus that supports both low-speed and high-speed peripheral devices. The single physical bus that represents a combination of a low-speed and a high-speed bus contains a single set of data/address lines and a single set of most of the control lines as well as a small number of dedicated low-speed bus cycle control signal lines and an equal number of dedicated high-speed bus cycle control lines. The bus interface for the combined low-speed and high-speed bus includes an arbiter that ensures that low-speed bus operations do not interfere with high-speed bus operations, as well as a low-speed state machine that sequences signals propagated during low-speed operations and a high-speed state machine that sequences signals propagated during high-speed operations. The bus interface may include separate data and address buffers for low-speed and high-speed operations or may include a single data buffer and a single address buffer that are shared between low-speed and high-speed operations. Transmission of data between low-speed and high-speed devices may be accomplished by operating the bus at one speed to obtain the data from one device, buffering the obtained data within the bus interface, and operating the bus at a different speed in order to transmit the buffered data to the second device. Alternatively, the low-speed and high-speed state machines may be synchronized to allow transmission of data between low-speed and high-speed devices without using data buffering.

The embodiment discussed below relates to the combination of a low-speed PCI bus with either a high-speed PCI bus or a high-speed AGP bus within a PC. The principle of time multiplexing low-speed and high-speed buses within a single physical bus can, however, be implemented using a large variety of buses and can be implemented in any number of different types of computer systems.

Figure 2:
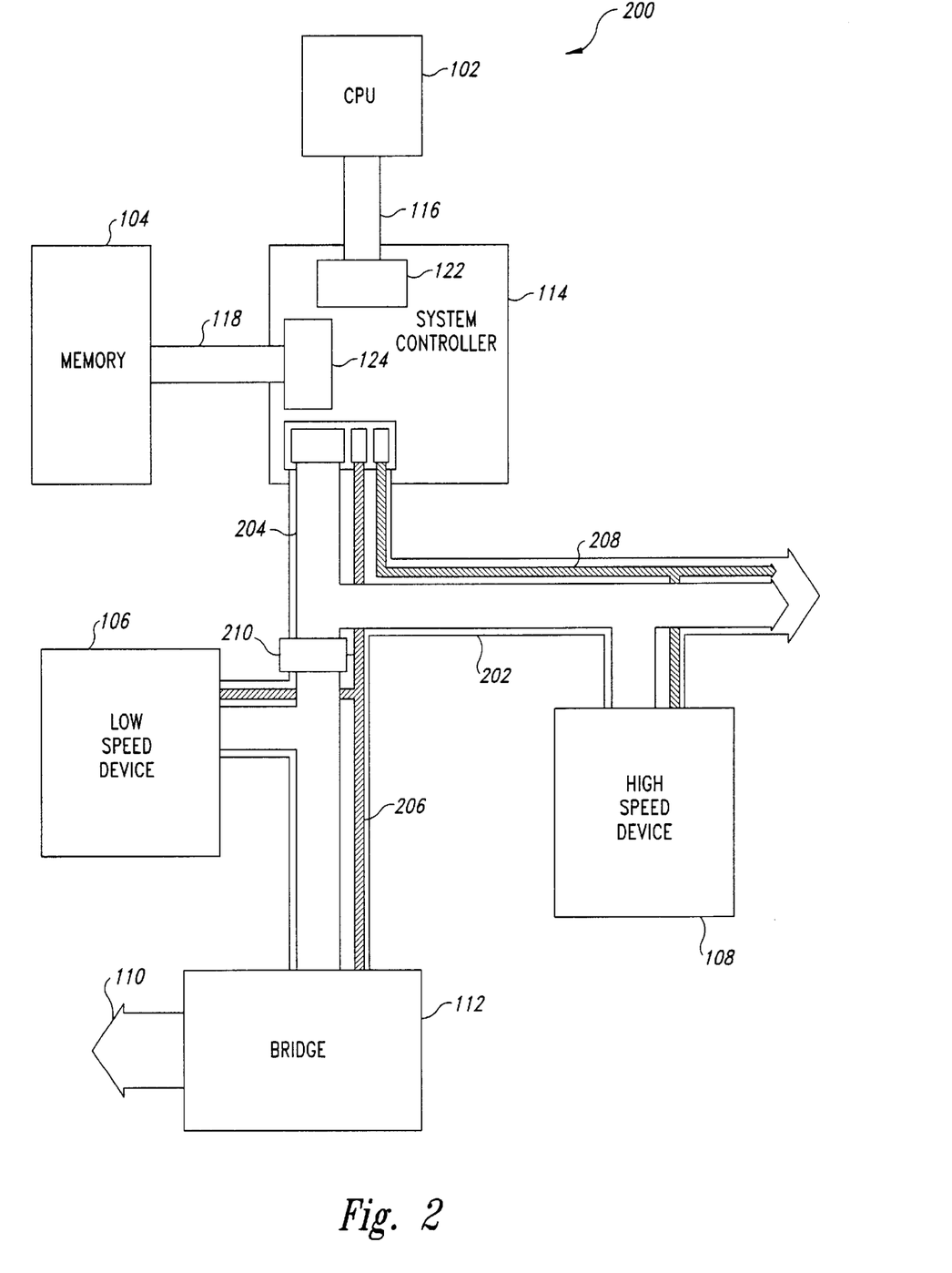
FIG. 2 is a block diagram of the bus architecture of a PC employing a single low-speed/high-speed time multiplexed bus.

FIG. 2 is a block diagram of the bus architecture of a PC 200 employing a single low-speed/high-speed time multiplexed bus ("LS/HS-B") 202. The majority of the components shown in FIG. 2 are identical to the components shown in FIG. 1. Thus, in the interest of brevity, those components of FIG. 2 that are identical to the components in FIG. 1 have been provided with the same reference numerals as in FIG. 1, and an explanation of their operation will not be repeated.

Whereas a conventional PC 100, as shown in FIG. 1, includes both a low-speed PCI bus 120 and a high-speed PCI or AGP bus 121, the PC 200 diagrammed in FIG. 2 contains a single LS/HS-B 202. The LS/HS-B 202 contains shared data, address, and control signal lines 204 as well as dedicated low-speed bus cycle control lines 206 and dedicated high-speed bus cycle control lines 208. The LS/HS-B 202 also contains a quick switch 210 which is used to electronically isolate the high capacitance low-speed devices 106 and 112 from the data/address lines and the shared control lines 204 of the LS/HS-B 202 when the LS/HS-B is operating at high speed.

When the LS/HS-B 202 is implemented for the PCI or PCI and AGP architectures, the dedicated bus cycle control lines 206 and 208 include the FRAME#, IRDY#, and TRDY# control lines. The FRAME#, or cycle frame signal indicates the start and duration of a transaction such as a read or write. The TRDY#, or target ready signal is asserted by a target device to indicate that the target device is ready to complete the current data phase of the operation. The IRDY#, or initiator ready signal is asserted by a device to indicate that the device is driving valid data onto the bus as part of an operation. These three signals thus comprise a handshake mechanism that allow an initiator device and a target device to begin and complete a data transfer operation. A PCI bus contains a number of other control signal lines, including the STOP#, LOCK#, IDSEL, and DEVSEL# signals. These additional control lines do not need to be duplicated for inclusion in the dedicated low-speed and high-speed control line sets within the LS/HS-B 202 because there is one of each of these additional control lines dedicated to each device connected to a PCI or AGP bus. Thus, the LS/HS-B 202 requires separate dedicated low-speed 206 and high-speed 208 signal line sets comprising only the control lines corresponding to the FRAME#, IRDY#, and TRDY# signals.

Consider the combination of a low-speed 64-bit PCI bus and a high-speed 64-bit PCI bus together into a single LS/HS-B. Conventional time multiplexing in both buses allows the 64 data lines to be physically coexistent with the 64 address lines. Each PCI bus has a total of 100 signal lines (64 address/data lines and 36 control lines) rather than 164 signal lines that would be required if conventional time multiplexing was not used for data transmission and addressing over shared data/address lines. By combining the low-speed PCI and the high-speed PCI together into a single LS/HS-B, the resulting LS/HS-B contains 103 discrete physical signal lines rather than the 200 signal lines that comprise the separate low-speed PCI and high-speed PCI buses. The number of pin connections required for the LS/HS-B bus interface thus only slightly exceeds one-half of the number of pin connections required for separate low-speed and high-speed buses. The LS/HS-B bus provides the same connectivity and nearly the same bandwidth that are provided by the two separate low-speed and high-speed buses.

Figure 3:
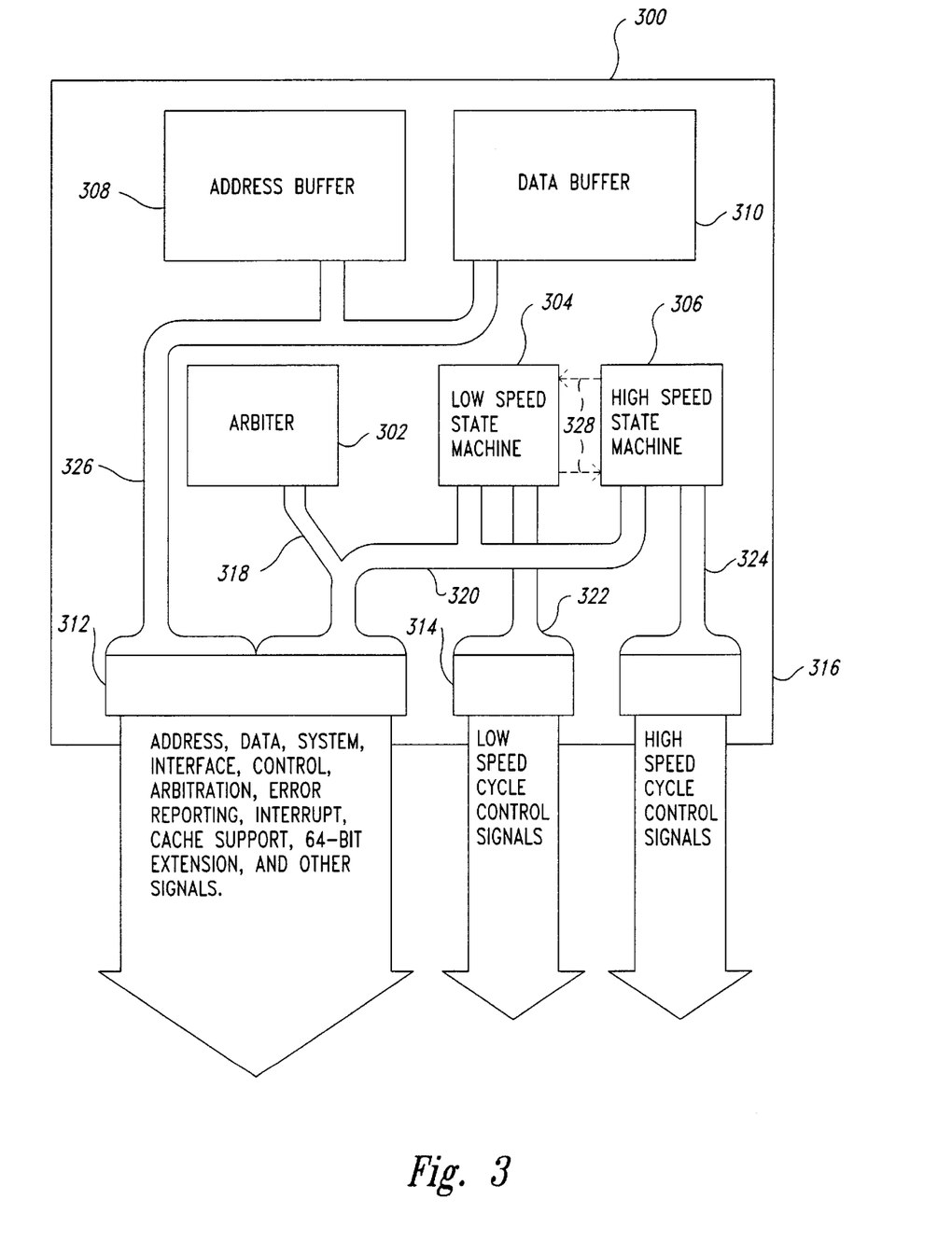
FIG. 3 is a block diagram of internal components of the low-speed/high-speed time multiplexed bus interface.

FIG. 3 is a block diagram of internal components of the LS/HS-B bus interface 300. The LS/HS-B bus interface 300 contains an arbiter 302, a low-speed state machine 304, a high-speed state machine 306, an address buffer 308, a data buffer 310, pin connections for the shared signal lines 312, pin connections for the low-speed bus cycle control lines 314, and pin connections for the high-speed bus speed control lines 316. The arbiter 302 is connected to those control lines of the PCI bus 318 related to arbitration of bus usage for different devices. The arbiter 302 essentially fields competing requests for bus usage and allocates the bus to only one device at a time. The arbiter makes the low-speed state machine 304 active during low-speed bus operations, and makes the high-speed state machine 306 active during high-speed bus operations. The arbiter also isolates low-speed devices from the shared data/address lines of the bus by activating the quickswitch 210. The low-speed and high-speed state machines 304, 306, respectively, are each connected to a portion of the shared control signal lines 320. The low-speed state machine 304 is, in addition, connected through a bus 322 to the low-speed bus cycle control signals 314, and the high-speed state machine 306 is, in addition, connected through a bus 324 to the high-speed bus cycle control signals 316. The low-speed state machine 304 controls the sequencing of control signals during low-speed bus operations and the high-speed state machine 306 controls sequencing of the control signals during high-speed bus operations. The LS/HS-B bus interface 300 contains both an address buffer 308 and a data buffer 310. These buffers are shared during both low-speed and high-speed operations. As an alternative implementation, the LS/HS-B bus interface 300 may contain separate address and data buffers (not shown) for low-speed operations and for high-speed operations. The address and data buffers 308 and 310 are connected to the data and address lines 326. A conventional PCI bus interface 300 contains an arbiter, a state machine, and address and data buffers. The LS/HS-B bus interface 300 differs from a conventional PCI bus interface primarily in having two state machines 304 and 306 rather than a single, conventional state machine.

A special problem arises when data is transferred between a low-speed device 106 and a high-speed device 108. Although such an operation generally occurs infrequently, the LS/HS-B bus 202 must conceptionally be either in a high-speed or in a low-speed mode at any single time. In one preferred implementation, the LS/HS-B bus 202 operates at the bus speed of the device providing data, fetches that data and places the data into a buffer (not shown) within the LS/HS-B bus interface 300. The LS/HS-B bus 202 then transitions to the speed of the device that receives the data during the operation and transfers the data from the buffer to that device while operating at the speed required by that device.

Although the present invention has been described in terms of one embodiment, it is not intended that the invention be limited to this embodiment. Modification within the spirit of the invention will be apparent to those skilled in the art. For example, as noted above, low-speed and high-speed versions of a large variety of different types of buses may be combined together to form a single physical bus with multiplexed low-speed and high-speed operations. As another example, different components and combinations of components can be used to implement the functions of the components shown in FIG. 3 within the buffer interface of a low-speed/high-speed time multiplexed bus. In different types of bus architectures, a different number of bus cycle control signals may need to be provided in redundant, dedicated low-speed and high-speed sets. Low-speed/high-speed time multiplexing can be implemented without implementing conventional time multiplexing or, in other words, the data and address lines need not be physically coexistent in a low-speed/high-speed time multiplexed bus. The scope of the present invention is defined by the claims that follow.

What is claimed is:

1. A method of communicating between a central communications device, a high-speed device and a plurality of low-speed devices, comprising:

communicating between the central communications device and the high-speed device and between the central communications device and each of the low-speed devices through a set of bus lines that are shared by the high-speed device and the low-speed device;

communicating between the central communications device and the high-speed device through a set of high-speed bus lines and between the central communications device and each of the low-speed devices through a set of low-speed bus lines, the low-speed lines being separate from the high-speed lines;

communicating between a first and a second of the low-speed devices by the first low-speed device initiating a bus operation with the second low-speed device, and using the shared bus lines and the low-speed set of bus lines to carry out the bus operation; and communicating between one of the low-speed devices and the high-speed device by initiating a bus operation as follows:

when the low-speed device transmits data as part of the bus operation, transmitting the data to the central communications device using the shared bus lines and the low-speed set of bus lines;

when the high-speed device transmits data as part of the bus operation, transmitting the data to the central communications device using the shared bus lines and the high-speed set of bus lines;

when the low-speed device receives data as part of the bus operation, transmitting the data from the central communications device to the low-speed device using the shared bus lines and the low-speed set of bus lines; and when the high-speed device receives data as part of the bus operation, transmitting the data from the central communications device to the high-speed device using the shared bus lines and the high-speed set of bus lines.

2. The method of claim 1 wherein the central communications device further includes an arbiter, a low-speed state machine, and a high-speed state machine, the method further comprising:

detecting a speed of a device that initiates a bus operation by the arbiter;

when the detected device speed is low, activating the low-speed state machine to control the sequencing of signal propagation over the bus lines during an initial portion of the execution of the bus operation; and when the detected device speed is high, activating the high-speed state machine to control the sequencing of signal propagation over the bus lines during an initial portion of the execution of the bus operation.

3. The method of claim 2 further comprising:

when a bus operation between a low-speed and a high-speed device is initiated, following transmission of the data to the central communications device by the device that transmits data for the operation, storing the transmitted data in a buffer;

activating the state machine that corresponds in speed to the device that receives data as a result of the bus operation by the arbiter; and completing the bus operation by retrieving the data stored in the buffer and transmitting the data over bus lines to the device that receives data as a result of the bus operation.

4. The method of claim 3 further comprising:

when a bus operation between a low-speed and a high-speed device is initiated, synchronizing and interleaving operation of the low-speed state machine with operation of the high-speed state machine so that transmission of the data via the bus by the device that transmits data for the operation is controlled by the state machine that corresponds in speed to the device that transmits data for the operation after which the state machine that corresponds in speed to the device that receives data as a result of the bus operation controls completion of the bus operation.

5. The method of claim 4 wherein the central communications device includes a data buffer and an address buffer, the method further comprising:

sharing use of the data buffer and address buffer during execution of bus operations at both low speed and high speed.

6. The method of claim 4 wherein the central communications device includes a low-speed data buffer, a high-speed data buffer, a low-speed address buffer, and a high-speed address buffer, the method further comprising:

using the low-speed data buffer and the low-speed address buffer during execution of bus operations at low speed; and using the high-speed data buffer and the high-speed address buffer during execution of bus operations at high speed.

7. The method of claim 4 wherein the bus supports 33 megahertz PCI bus operations and 66 megahertz PCI bus operations and wherein the low-speed and high-speed sets of bus lines each comprise FRAME#, IRDY#, and TRDY# bus lines.

8. The method of claim 4 wherein the bus supports 33 megahertz PCI bus operations and 133 megahertz AGP bus operations and wherein the low-speed and the high-speed sets of bus lines each comprise FRAME#, IRDY#, and TRDY# bus lines.

9. The method of claim 4 further comprising electrically isolating the low-speed devices from the shared set of bus lines during high-speed operations by using the arbiter to activate a switch controlling propagation of signals via the shared of bus lines.

10. A method of communicating between a system controller, a plurality of high-speed devices and a plurality of low-speed devices, the high-speed and low-speed devices being coupled to the system controller through a bus having a plurality of bus lines, the method comprising:

communicating at a high rate of speed between the system controller and each of the high-speed devices through a first set of the bus lines and a second set of the bus lines, the bus lines in the first set being different from the bus lines in the second set; and communicating at a low rate of speed between the system controller and each of the low-speed devices through the first set of the bus lines and a third set of the bus lines, the bus lines in the third set being different from the bus lines in the first set and the bus lines in the second set;

communicating between a first and a second of the low-speed devices by the first low-speed device initiating a bus operation with the second low-speed device, and using the first set and third set of bus lines at low speed to carry out the bus operation;

communicating between a first and a second of the high-speed devices by the first high-speed device initiating a bus operation with the second high-speed device using the first set and second set of bus lines at high speed to carry out the bus operation; and communicating between one of the low-speed devices and one of the high-speed devices by initiating a bus operation as follows:

when the low-speed device transmits data as part of the bus operation, transmitting the data to the system controller using the first set and the third set of bus lines;

when the high-speed device transmits data as part of the bus operation, transmitting the data to the system controller using the first set and the second set of bus lines;

when the low-speed device receives data as part of the bus operation, transmitting the data from the system controller to the low-speed device using the first set and the third set of bus lines; and when the high-speed device receives data as part of the bus operation, transmitting the data from the system controller to the high-speed device using the first set and the second set of bus lines.

11. The method of claim 10 wherein the system controller further includes an arbiter, a low-speed state machine, and a high-speed state machine, the method further comprising:

detecting a speed of a device that initiates a bus operation by the arbiter;

when the detected device speed is low, activating the low-speed state machine to control the sequencing of signal propagation over the bus lines during an initial portion of the execution of the bus operation; and when the detected device speed is high, activating the high-speed state machine to control the sequencing of signal propagation over the bus lines during an initial portion of the execution of the bus operation.

12. The method of claim 11 further comprising:

when a bus operation between a low-speed and a high-speed device is initiated, following transmission of the data to the system controller by the device that transmits data for the operation, storing the transmitted data in a buffer;

activating the state machine that corresponds in speed to the device that receives data as a result of the bus operation by the arbiter; and completing the bus operation by retrieving the data stored in the buffer and transmitting the data over bus lines to the device that receives data as a result of the bus operation.

13. The method of claim 12 further comprising:

when a bus operation between a low-speed and a high-speed device is initiated, synchronizing and interleaving operation of the low-speed state machine with operation of the high-speed state machine so that transmission of the data via the bus by the device that transmits data for the operation is controlled by the state machine that corresponds in speed to the device that transmits data for the operation after which the state machine that corresponds in speed to the device that receives data as a result of the bus operation controls completion of the bus operation.

14. The method of claim 13 wherein the system controller includes a data buffer and an address buffer, the method further comprising:

sharing use of the data buffer and address buffer during execution of bus operations at both low speed and high speed.

15. The method of claim 13 wherein the system controller includes a low-speed data buffer, a high-speed data buffer, a low-speed address buffer, and a high-speed address buffer, the method further comprising:

using the low-speed data buffer and the low-speed address buffer during execution of bus operations at low speed; and using the high-speed data buffer and the high-speed address buffer during execution of bus operations at high speed.

16. The method of claim 13 wherein the bus supports 33 megahertz PCI bus operations and 66 megahertz PCI bus operations and wherein the second and third sets of bus lines each comprise FRAME#, IRDY#, and TRDY# bus lines.

17. The method of claim 13 wherein the bus supports 33 megahertz PCI bus operations and 133 megahertz AGP bus operations and wherein the second and third sets of bus lines each comprise FRAME#, IRDY#, and TRDY# bus lines.

18. The method of claim 13 further comprising electrically isolating the low-speed devices from the first set of bus lines during high-speed operations by using the arbiter to activate a switch controlling propagation of signals via the first set of bus lines.

19. A method for time multiplexing a low-speed communications bus and a high-speed communications bus on a single physical communications bus, the method comprising:

connecting at least one low-speed device to the physical communications bus;

connecting at least one high-speed device to the physical communications bus;

when a low-speed device initiates a bus operation with another low-speed device, operating the physical communications bus at low speed to carry out the bus operation;

when a high-speed device initiates a bus operation with another high-speed device, operating the physical communications bus at high speed to carry out the bus operation; and when a bus operation between a low-speed and a high-speed device is initiated, operating the physical communications bus at the speed required by the device that transmits data for the operation, transmitting the data to the physical communications bus by the device that transmits data for the operation, operating the physical communications at the speed required by the device that receives data as a result of the bus operation, and receiving the data transmitted to the bus by the device that receives data as a result of the bus operation.

20. The method of claim 19 wherein the physical communications bus comprises signal lines, the method further comprising:

separating the signal lines into a first group of signal lines that can be operated at either low-speed or at high-speed and a second group of signal lines that need to be operated at only a single speed;

duplicating the second group of signal lines to provide a dedicated low-speed group of signal lines and a dedicated high-speed group of signal lines;

connecting one or more low-speed devices to the first group of signal lines and to the dedicated low-speed group of signal lines; and connecting one or more high-speed devices to the first group of signal lines and to the dedicated high-speed signal lines.

21. The method of claim 20 wherein the physical communications bus further comprises an arbiter, a low-speed state machine, and a high-speed state machine, the method further comprising:

detecting a speed of a device that initiates a bus operation by the arbiter;

when the detected device speed is low, activating the low-speed state machine to control the sequencing of signal propagation over the signal lines during an initial portion of the execution of the bus operation; and when the detected device speed is high, activating the high-speed state machine to control the sequencing of signal propagation over the signal lines during an initial portion of the execution of the bus operation.

22. The method of claim 21 further comprising:

when a bus operation between a low-speed and a high-speed device is initiated, following transmission of the data to the physical communications bus by the device that transmits data for the operation, storing the transmitted data in a buffer;

activating the state machine that corresponds in speed to the device that receives data as a result of the bus operation by the arbiter; and completing the bus operation by retrieving the data stored in the buffer and transmitting the data over signal lines to the device that receives data as a result of the bus operation.

23. The method of claim 21 further comprising:

when a bus operation between a low-speed and a high-speed device is initiated, synchronizing and interleaving operation of the low-speed state machine with operation of the high-speed state machine so that transmission of the data to the physical communications bus by the device that transmits data for the operation is controlled by the state machine that corresponds in speed to the device that transmits data for the operation after which the state machine that corresponds in speed to the device that receives data as a result of the bus operation controls completion of the bus operation.

24. The method of claim 21 wherein the physical communications bus further comprises a data buffer and an address buffer, the method further comprising:

sharing use of the data buffer and address buffer during execution of bus operations at both low speed and high speed.

25. The method of claim 21 wherein the physical communications bus further comprises a low-speed data buffer, a high-speed data buffer, a low-speed address buffer, and a high-speed address buffer, the method further comprising:

using the low-speed data buffer and the low-speed address buffer during execution of bus operations at low speed; and using the high-speed data buffer and the high-speed address buffer during execution of bus operations at high speed.

26. The method of claim 21 wherein the physical communications bus supports a 33 megahertz PCI bus and a 66 megahertz PCI bus and wherein the dedicated low-speed and dedicated high-speed sets of signal lines each comprise FRAME#, IRDY#, and TRDY# signal lines.

27. The method of claim 21 wherein the physical communications bus supports a 33 megahertz PCI bus and a 133 megahertz AGP bus and wherein the dedicated low-speed and dedicated high-speed sets of signal lines each comprise FRAME#, IRDY#, and TRDY# signal lines.

28. The method of claim 21 further comprising electrically isolating the low-speed devices from the shared signal lines of the physical communications bus during high-speed operations by using the arbiter to activate a switch controlling propagation of signals via the shared signal lines.

29. A method for increasing the reliability and decreasing the cost of a system controller by decreasing the pin connectors required on the system controller to support bus connections to buses that connect the system controller to peripheral devices in a computer system, each bus comprising signal lines, an arbiter, and a state machine, the method comprising:

combining multiple buses into a single physical bus that contains less signal lines and correspondingly requires less pin connectors than the sum of the signal lines contained in and pin connectors required by the multiple buses, the single physical bus having an arbiter and one or more state machines; and connecting the system controller and the peripheral devices to the single physical bus;

detecting a speed of a peripheral device that initiates a bus operation by the arbiter;

when a low-speed peripheral device initiates a bus operation with another low-speed peripheral device, activating the low-speed state machine to control operation of the physical bus at low speed to carry out the bus operation;

when a high-speed peripheral device initiates a bus operation with another high-speed peripheral device, activating the high-speed state machine to control operation of the physical bus at high speed to carry out the bus operation; and when a bus operation between a low-speed and a high-speed peripheral device is initiated, activating the state machine corresponding in speed to the peripheral device that transmits data for the operation in order to operate the physical bus at the speed required by the peripheral device that transmits data for the operation, transmitting the data to the physical bus by the peripheral device that transmits data for the operation, activating the state machine corresponding in speed to the peripheral device that receives data as a result of the bus operation in order to operate the physical bus at the speed required by the peripheral device that receives data as a result of the bus operation, and receiving the data transmitted to the physical bus by the peripheral device that receives data as a result of the bus operation.

30. The method of claim 29 wherein a 33 megahertz PCI bus and a 133 megahertz AGP bus are combined together into the single physical bus.

31. The method of claim 29 wherein a 33 megahertz PCI bus and a 66 megahertz PCI bus are combined together into the single physical bus.

32. The method of claim 29 further comprising:
when a bus operation between a low-speed and a high-speed peripheral device is initiated,
following transmission of the data to the physical bus by the peripheral device that transmits data for the operation, storing the transmitted data in a buffer; and
following activation the state machine that corresponds in speed to the peripheral device that receives data as a result of the bus operation, completing the bus operation by retrieving the data stored in the buffer and transmitting the data over signal lines to the peripheral device that receives data as a result of the bus operation.

33. The method of claim 32 further comprising:
when a bus operation between a low-speed and a high-speed peripheral device is initiated,
synchronizing and interleaving operation of the low-speed state machine with operation of the high-speed state machine so that transmission of the data to the physical bus by the peripheral device that transmits data for the operation is controlled by the state machine that corresponds in speed to the peripheral device that transmits data for the operation after which the state machine that corresponds in speed to the peripheral device that receives data as a result of the bus operation controls completion of the bus operation.

34. The method of claim 33 wherein the physical bus further comprises a data buffer and an address buffer, the method further comprising:
sharing use of the data buffer and address buffer during execution of bus operations at both low speed and high speed.

35. The method of claim 29 wherein the physical bus further comprises a low-speed data buffer, a high-speed data buffer, a low-speed address buffer, and a high-speed address buffer, the method further comprising:
using the low-speed data buffer and the low-speed address buffer during execution of bus operations at low speed; and
using the high-speed data buffer and the high-speed address buffer during execution of bus operations at high speed.

36. The method of claim 29 wherein the dedicated low-speed and dedicated high-speed sets of signal lines each comprise FRAME#, IRDY#, and TRDY# signal lines.

37. The method of claim 29 further comprising electrically isolating the low-speed peripheral devices from the shared signal lines of the physical bus during high-speed operations by using the arbiter to activate a switch controlling propagation of signals via the shared signal lines.

38. The method of claim 29 wherein peripheral devices may include bus bridges.

* * * * *

UNITED STATES PATENT AND TRADEMARK OFFICE
CERTIFICATE OF CORRECTION

PATENT NO. : 6,311,245 B1
DATED : October 30, 2001
INVENTOR(S) : Dean A. Klein

It is certified that error appears in the above-identified patent and that said Letters Patent is hereby corrected as shown below:

Column 8,
Line 51, "shared of bus lines" should read -- shared set of bus lines --

Signed and Sealed this

Sixteenth Day of April, 2002

Attest:

JAMES E. ROGAN
*Attesting Officer*  *Director of the United States Patent and Trademark Office*